(12) United States Patent
Iwamoto et al.

(10) Patent No.: US 10,556,512 B2
(45) Date of Patent: Feb. 11, 2020

(54) POWER CONTROL METHOD, COMMUNICATION DEVICE, AND POWER CONTROL SYSTEM

(71) Applicant: Sony Corporation, Tokyo (JP)

(72) Inventors: Kyohei Iwamoto, Tokyo (JP); Taiji Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 15/092,841

(22) Filed: Apr. 7, 2016

(65) Prior Publication Data

US 2016/0214497 A1 Jul. 28, 2016

Related U.S. Application Data

(63) Continuation of application No. 13/515,207, filed as application No. PCT/JP2010/071764 on Nov. 29, 2010, now abandoned.

(30) Foreign Application Priority Data

Dec. 18, 2009 (JP) .................. 2009-287260

(51) Int. Cl.
*B60L 53/60* (2019.01)
*B60L 11/18* (2006.01)
(Continued)

(52) U.S. Cl.
CPC .......... *B60L 11/1838* (2013.01); *B60L 53/60* (2019.02); *G05B 15/02* (2013.01); *H04W 52/0206* (2013.01)

(58) Field of Classification Search
CPC .......... B60L 11/1838; H04W 52/0206; G05B 15/02; H04Q 9/00; H02J 3/14; H02J 13/0075
See application file for complete search history.

(56) References Cited

U.S. PATENT DOCUMENTS

2005/0054337 A1   3/2005   Nobusawa et al.
2009/0243517 A1   10/2009  Verfuerth et al.
(Continued)

FOREIGN PATENT DOCUMENTS

JP   11-222834   5/1989
JP   10-276478   10/1998
(Continued)

OTHER PUBLICATIONS

Extended European Search Report, dated Apr. 29, 2016 in EP Application 10837461.2, 7 pages.
(Continued)

*Primary Examiner* — Nathan L Laughlin
(74) *Attorney, Agent, or Firm* — K&L Gates LLP

(57) ABSTRACT

Power control can be performed for electronic apparatuses that are unable to connect to a network. A user accesses the URL of a power supply center, and downloads an application (S11). The application is downloaded for each individual electronic apparatus to be controlled. In S12, the user makes various settings. After the settings are complete, the power supply center 2 transmits a power-limiting signal (S2), and a communication device receives the power-limiting signal (S13). If it is determined in S14 that the power-limiting function is set active, the application is started in S16. In S17, the kind of the communication that has been set is infrared. If the kind of the communication is infrared, in S18, a power-limiting signal is transmitted to a target electronic apparatus via infrared communication.

14 Claims, 4 Drawing Sheets

(51) Int. Cl.
*G05B 15/02* (2006.01)
*H04W 52/02* (2009.01)

(56) References Cited

U.S. PATENT DOCUMENTS

| | | | | |
|---|---|---|---|---|
| 2010/0094496 | A1* | 4/2010 | Hershkovitz | B60L 3/12 |
| | | | | 701/22 |
| 2010/0106401 | A1* | 4/2010 | Naito | B60L 11/1809 |
| | | | | 701/533 |
| 2010/0145609 | A1* | 6/2010 | Boss | G01C 21/3469 |
| | | | | 701/22 |
| 2010/0324962 | A1* | 12/2010 | Nesler | G01R 21/133 |
| | | | | 705/7.36 |

FOREIGN PATENT DOCUMENTS

| | | |
|---|---|---|
| JP | 10-276487 | 10/1998 |
| JP | 11-118225 | 4/1999 |
| JP | 2000-102102 | 4/2000 |
| JP | 2011-188596 | 4/2000 |
| JP | 2001-258176 | 9/2001 |
| JP | 2002-204292 | 7/2002 |
| JP | 2003-102110 | 4/2003 |
| JP | 2003-333585 | 11/2003 |
| JP | 2004-173241 | 6/2004 |
| JP | 2005-090787 | 4/2005 |
| JP | 2006-331405 | 12/2006 |
| JP | 2000-102103 | 6/2007 |
| JP | 2007-148590 | 6/2007 |
| JP | 2011-083166 | 4/2011 |
| JP | 2011-163812 | 8/2011 |

OTHER PUBLICATIONS

Japanese Patent Office, Decision of refusal issued in connection with Japanese Patent Application No. 2009-287260, dated May 20, 2014. (2 pages).

State Intellectual Property Office of P.R.C. Notification of the First Office Action issued in connection with P.R.C. Application No. 201080055929.4m, dated Jan. 3, 2014. (19 pages).

Japanese Office Action dated Sep. 17, 2013 for corresponding Japanese Appln. No. 2009-287260.

\* cited by examiner

FIG. 3
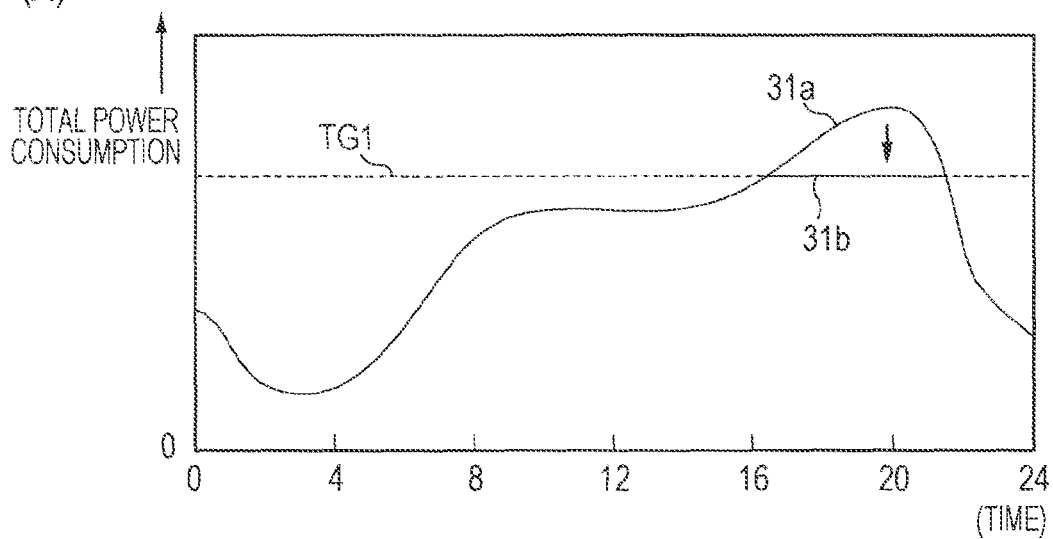
(A)
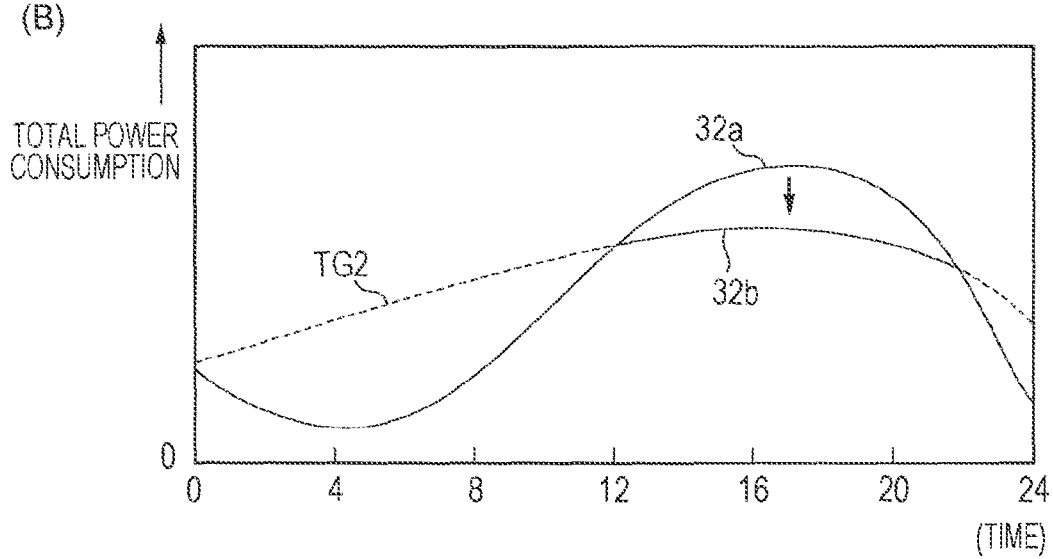
(B)

POWER CONTROL METHOD, COMMUNICATION DEVICE, AND POWER CONTROL SYSTEM

CROSS REFERENCES TO RELATED APPLICATIONS

The present application is a continuation of U.S. application Ser. No. 13/515,207, filed Jun. 11, 2012, which is a national stage of International Application No. PCT/JP2010/071764 filed on Nov. 29, 2010 and claims priority to Japanese Patent Application No. 2009-287260 filed on Dec. 18, 2009, the disclosure of which is incorporated herein by reference.

BACKGROUND

The present disclosure relates to a power control method, a communication device, and a power control system that are used to control the power consumption of electronic apparatuses installed in homes, for example.

Lately, power generation utilizing renewable energy instead of fossil fuels is being put into practical use. It is regarded as a certainty that this trend will further strength in the future. As power generation utilizing renewable energy, photovoltaic power generation, wind power generation, wind power generation, biomass power generation, wave activated power generation, and the like have been developed. Under such circumstances, it is desired that power consumption (load) fluctuations on the side of consumers such as ordinary homes, office buildings, and factories be as small as possible.

Owing to the instability of the amount of power generation in cases where renewable energy is introduced, load leveling is required to maintain the quality of supply power. Further, for the power supply side as well, investments in power sources to meet load peaks can be avoided, thereby improving profitability. A next generation power network (hereinafter, referred to as smart grid), which utilizes information technologies to solve problems associated with transfer of electric power between suppliers and consumers, makes it possible to control and thereby suppress power consumption on the consumer side from the supplier side (DR (Demand Response). For example, during times of peak power demand, power utilities control load by changing the temperature settings of air conditioners in houses. Including this DR, undertaking measures directed toward consumers from the supply side is called DSM (Demand Side Management).

In PTL 1, it is described that a centralized power DSM controller is connected to a DSM command station in a power company via a public network, and limitations are placed on the use of electric power by a plurality of electronic apparatuses connected to a home network in a home. That is, it is described that the centralized power DSM controller controls use of electric power in accordance with the consumers' demands and priorities. In PTL 2, it is described that the power consumption of a plurality of appliances connected to a home network is controlled by a central controller, each of the appliances includes a secondary battery, and during time periods of peak power usage, the appliance operates on electric power from the secondary battery, and in other time periods, the appliance operates on electric power from a commercial power source, and the secondary battery is charged. The central controller receives a power control command from the power supplier side.

CITATION LIST

Patent Literature

PTL 1: Japanese Unexamined Patent Application Publication No. 11-222834
PTL 2: Japanese Unexamined Patent Application Publication No. 2001-258176

SUMMARY

Technical Problem

The techniques described in PTL 1 and PTL 2 make it necessary to control electronic apparatuses within the home with respect to a controller provided for each individual home, and connect the controller to a DSM control center in the power company. Accordingly, the controller itself is required. Further, both a network for connecting the controller to the DSM control center, and a network for controlling the electronic apparatuses within the home with respect to the controller are required. As a result, significant changes to the existing power network are required, making it difficult to achieve leveling of electric power. Further, in addition to these problems, the technique using a secondary battery described in PTL 2 also has a problem in that installation of the secondary battery, and control of the secondary battery become necessary.

Accordingly, an object is to provide a communication device that can minimize changes to the existing power network in the case of performing leveling of power consumption.

Solution to Problem

To solve the above-mentioned problems, a method according to the present disclosure is a power control method including the steps of: transmitting a power control signal that controls electric power via a wireless network, by a power supply center provided on a power supply side; receiving the power control signal, by a first communication section of a communication device provided on a demand side; and transmitting a remote control signal that remote-controls power consumption of one or a plurality of electronic apparatuses in accordance with the received power control signal, by a second communication section of the communication device.

A device according to the present disclosure is a communication device including: a first communication section that receives a power control signal from a power supply side via a wireless network; and a second communication section that transmits a remote control signal that remote-controls power consumption of one or a plurality of electronic apparatuses in accordance with the received power control signal.

A system according to the present disclosure is a power control system including: a power supply center that is provided on a power supply side, and transmits a power control signal that controls electric power via a wireless network; and a communication device that is provided on a demand side, and includes a first communication section that receives the power control signal, and a second communication section that transmits a remote control signal that remote-controls power consumption of one or a plurality of electronic apparatuses in accordance with the received power control signal.

Preferred aspects are as follows.

Application data for generating the remote control signal with respect to the electronic apparatus to be controlled is received and stored in advance.

The communication device is a portable telephone that has a function of performing communication by an infrared ray or a radio wave.

Whether or not to perform power control is set in advance.

The first communication section receives the power control signal via an Internet.

The remote control signal transmitted by the second communication section uses an infrared ray or a radio wave as a medium.

Advantageous Effects of Invention

According to at least one embodiment, the power consumption of each individual home can be controlled from the supplier side even without provision of a controller called smart meter. Further, even in a state in which electronic apparatuses within the home are not connected to a network, the power consumption of each individual electronic apparatus can be controlled. In this way, even if the electronic apparatus itself does not have the function of being able to connect to a network, a reduction in power consumption can be achieved by exploiting the remote control function of the electronic apparatus. Further, if a portable telephone is used as the communication device, on the basis of a network application of the portable telephone, a remote commander that can be made subordinate to a network by controlling a communication function included in the portable telephone can be easily implemented.

Additional features and advantages are described herein, and will be apparent from the following Detailed Description and the figures.

BRIEF DESCRIPTION OF THE FIGURES

FIG. 3 is a schematic diagram used for describing operation in the first example.

DETAILED DESCRIPTION

Hereinafter, examples according to the present disclosure are described. It should be noted that the description is given in the following order.

<1. First Example>
<2. Second Example>
<3. Modifications>

The examples described below are preferred concrete examples of the invention. While various preferable technical limitations are given in the following description, the scope of the invention is not to be limited to these embodiments unless it is specifically stated that the embodiments limit the invention.

<1. First Example>
Example of Power Control System

Figure 1:
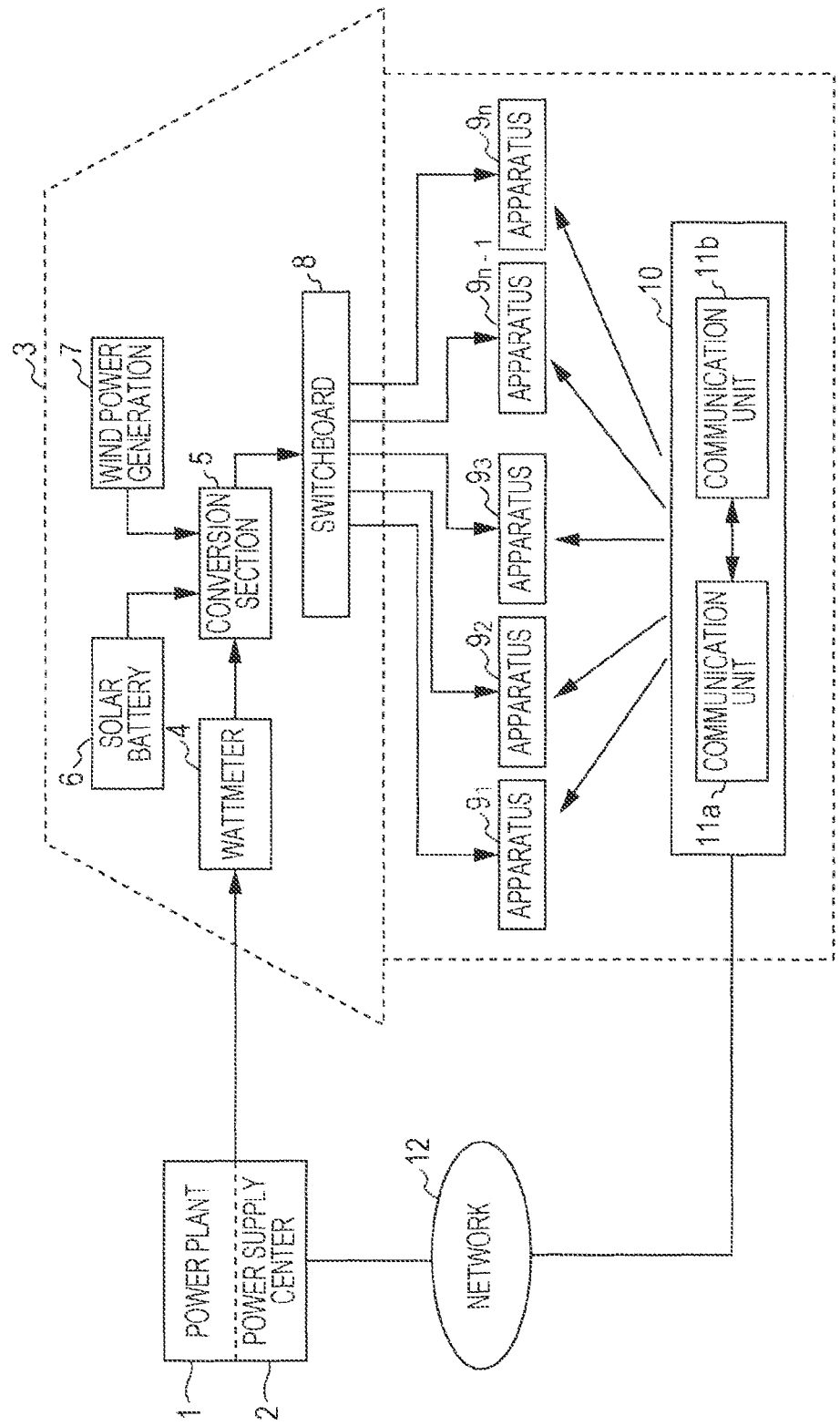
FIG. 1 is a block diagram of a first example of a power control system.

An example of a power control system is described with reference to FIG. 1. Electric power generated by a power plant 1 of a power supplier is connected to a wattmeter 4 in a home 3 via unillustrated power transmission network and power distribution network. The power plant 1 is a thermal power plant, a nuclear power plant, or the like. A power supply center 2 that generates a command for controlling power supply in association with the power plant 1 is provided.

The wattmeter 4 is connected with a conversion section 5. A solar battery 6 and a wind power generator 7 are connected to the conversion section 5. The electric power supplied to the wattmeter 4 in the home 2 from the power plant 1 is commercial alternating-current electric power. Electric power generated by the solar battery 6 and the wind power generator 7 is converted into alternating-current electric power in the conversion section 5, and introduced into the home while being added to the commercial alternating-current electric power. Other than the solar battery 6 and the win, a fuel battery, a storage battery, or the like may be used.

The alternating-current electric power from the conversion section 5 is supplied to a switchboard (including a distribution panel) 8, and is connected to electronic apparatuses 91, 92, . . . , 9n via lighting circuits and outlets taken from the switchboard 8. Examples of these electronic apparatuses 91 to 9n include an air conditioner, a refrigerator, a lighting fixture, a washing machine, and a television receiver. The electronic apparatuses 91 to 9n are electronic apparatuses that are subject to power control, and not meant to represent all electronic apparatuses within the home 2.

Further, to enable remote control by a communication device 10 (remote control commander), the electronic apparatuses 91 to 9n each have a communication device used for remote control. Remote control by the communication device 10 is performed in order to control power consumption of the electronic apparatuses. For example, On/Off of the power sources for the electronic apparatuses 91 to 9n is controlled by a remote control signal from the communication device 10. Alternatively, the electronic apparatuses 91 to 9n can be switched between a normal power consumption mode, and a low power consumption mode in which power consumption is lowered.

For example, transition from the normal power consumption mode to the low power consumption mode can be made by changing the temperature setting of an air conditioner during cooling to a higher temperature. In the case of a liquid crystal television, transition to the low power consumption mode can be made by lowering the illuminance of the back light, lowering the image processing function, lowering the operating clock frequency, and so on in comparison to the normal power consumption mode. In the case of a lighting fixture, transition to the low power consumption mode can be made by lowering the brightness of lighting. When changing modes, unlike a switching operation, the transition to another mode is controlled so as to take place gradually. This prevents discomfort to the user using the apparatus, and also makes it possible to prevent abrupt fluctuations in the amount of power consumption. In the case of an electronic apparatus not capable of such mode change, On/Off of the power source is controlled.

The remote control of the electronic apparatuses 91 to 91n is preferably performed by a remote control scheme identical or similar to an existing remote control scheme. As the medium for wireless communication of a remote control signal, an infrared ray or radio wave is used. As the remote control scheme using an infrared ray, an existing scheme used for the electronic apparatus may be used. For television receivers, air conditioners, lighting fixtures, and the like, remote control schemes using infrared rays have already been put into practical use. A new communication scheme different from existing ones may be also adopted.

As the remote control scheme using a radio wave, Bluetooth or Zigbee can be used. The Bluetooth scheme is applied to multimedia communications, and enables communications via one-to-many connection. The ZigBee scheme uses the physical layer of the IEEE (Institute of Electrical and Electronics Engineers) 802.15.4. The IEEE802.15.4 is the name of a short-range wireless network standard called PAN (Personal Area Network) or W (Wireless) PAN.

These wireless communication schemes using radio waves can prevent wiretapping and erroneous connections, thereby ensuring security. That is, an example of electronic apparatus that can be remote-controlled by the communication device 10 is a specific one or plurality of electronic apparatuses within the home 3. Which electronic apparatus to control is set when the communication device 10 downloads the application program. In the case of remote-controlling a plurality of electronic apparatuses, target electronic apparatuses are selected manually or automatically.

Further, as compared with infrared communication schemes, wireless communication schemes using radio waves have the advantage of being able to reach out-of-sight areas such as a different room. In the case of an average-size detached home, the remote control signal on a radio wave can be transmitted throughout the entire area within the home, and thus even electronic apparatuses to be controlled which are installed at distant locations can be remote-controlled by a single communication device 10.

The electronic apparatuses 91 to 9n may be connected with a secondary battery so that power supply can be received from the secondary battery. In cases where it is not possible to obtain an adequate function in relation to the amount of power consumption to be reduced, the electronic apparatus receives power supply from the secondary battery to satisfy the required function. Charging of the secondary battery is also performed in accordance with the power supply conditions in the power system. The charging operation of the secondary battery is controlled in the basis of a power control signal from the power supply center 2.

"With Regard to Communication Device"

The communication device 10 includes a communication unit 11a as a first communication section that receives a power control signal via a network 12 from the power supply center 2 as the power supply side. The communication device 10 includes a communication unit 11b as a second communication section that transmits a remote control signal that remote-controls the power consumption of the electronic apparatuses 91 to 9n in accordance with the received power control signal. Further, although not illustrated, the communication device 10 has a control section or the like that controls the overall operation of the communication device 10 including the communication units 11a and 11b.

In schemes using radio waves, for example, the Bluetooth scheme, with the communication unit 11b serving as a master, the communication unit 11b can remote-control seven slaves (the electronic apparatuses 91 to 9n) that can be connected concurrently within 10 m around the communication unit 11b. That is, the communication device 10 acts as a multi remote control. In the case of using the IEEE802.15.4 scheme, pairing is first established between the communication unit 11b and a communication unit in the electronic apparatus to be controlled.

An example of the communication device 10 is a portable telephone. Among existing portable telephones, those having the infrared communication function and/or Bluetooth function have been put into practical use. The second communication unit 11b can be configured by making use of this infrared communication and/or Bluetooth function. It should be noted that other than a portable telephone, the communication device 10 may be configured as a multi remote control commander.

A power control application (program) is downloaded and installed into the communication device 10 in advance via the network 12 (portable telephone network) and the communication unit 11a. For example, a portable telephone can access the URL of the power supply center 2 to download the application program. The power supply center 2 can identify users downloading the application program on the basis of information unique to individual portable telephones (e.g. telephone number). Accordingly, by accumulating information on users who have downloaded the power-limiting application program, it is possible to keep track of the approximate ratio of users who are using the power-limiting program within the coverage area of power supply, or provide services individually to such users from the power supply side. In this case, the power supply center 2 may be configured to receive the history of executed power-limiting operations from the portable telephone. For example, a conceivable configuration is to keep track of the fact that power limitation has been executed on the basis of an acknowledgment from the electronic apparatus side, and create history information on the power limitation.

A plurality of channels are made available for transmitting remote control signals. The user manipulates buttons while watching the screen to set an apparatus (such as a television, lighting, an air conditioner, or a personal computer) and set the manufacturer of the apparatus for an unoccupied channel. Existing programs can be used for the substantial part of the application program used for remote control. On/off control of the power source can be applied to the power limitation. Control of changes to the temperature setting of an air conditioner can be applied to the power limitation. Control of changes to the brightness setting of lighting can be applied to the power limitation. Control of changes to the luminance of images on a television receiver can be applied to the power limitation.

A power control signal is transmitted from the power supply center 2 via the network 12 to the communication device 10 installed with the power control application, for example, a portable telephone. The communication device 10 generates an infrared or radio-wave remote control signal for reducing power consumption of the electronic apparatuses 91 to 9n in response to the received power control signal. The electronic apparatuses 91 to 9n having received the remote control signal transitions from the normal power consumption mode to the low power consumption mode, thus forcing a reduction in power consumption in the home 3. An indication of the fact that power limitation has been executed is displayed on the screen of the portable telephone. In the case of the portable telephone, power limitation cannot be executed when the user is carrying the portable telephone outdoors. This means that, conveniently, power limitation is executed only when the user is at home and operating the electronic apparatus.

"Mode of Operation in First Example"

Figure 2:
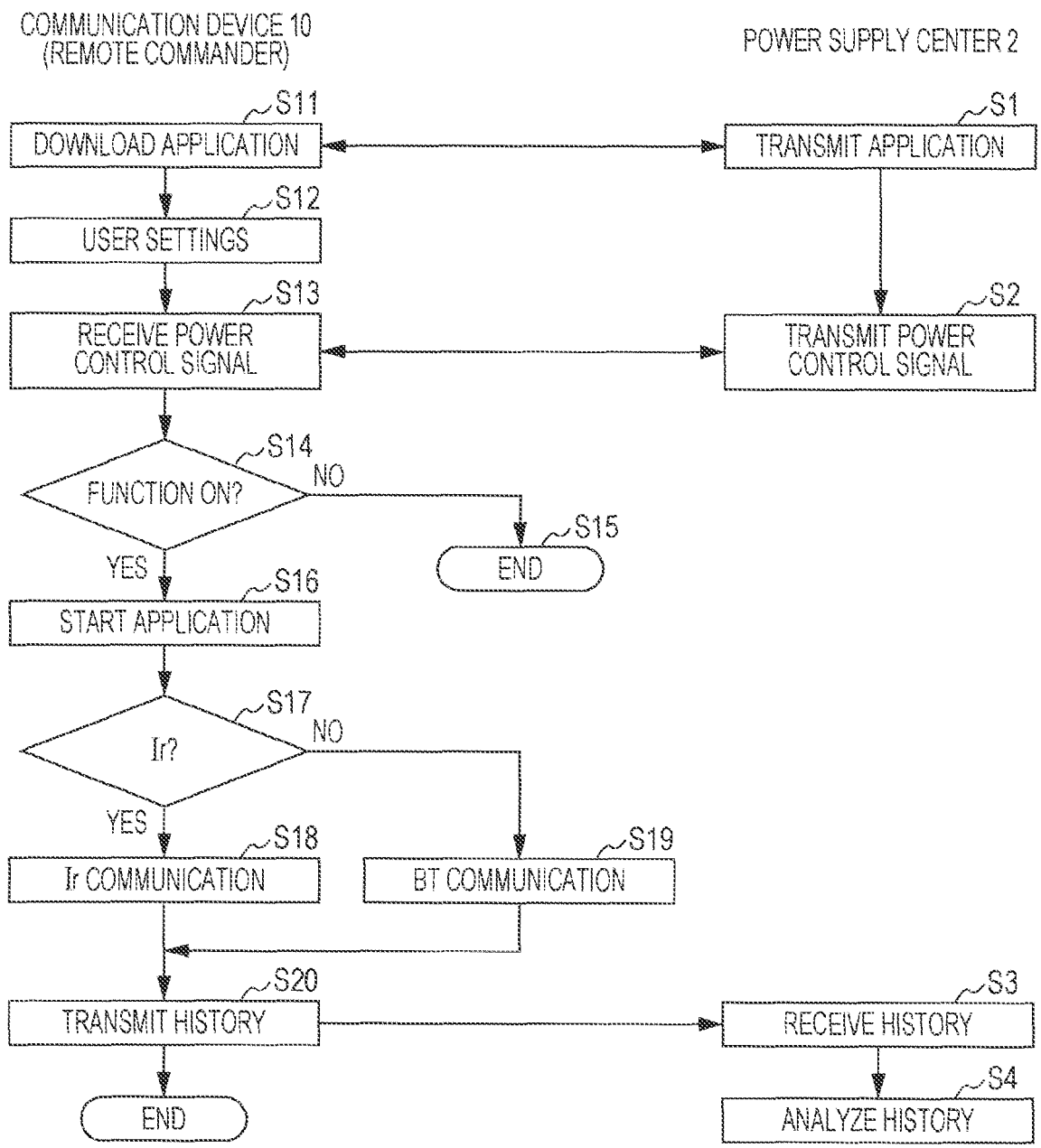
FIG. 2 is a flowchart used for describing operation in the first example.

Operation in the first example is described with reference to FIG. 2. FIG. 2 illustrates an overview of the flow of communication processing executed between the communication device 10 and the power supply center 2. The communication device 10 is, for example, a portable telephone, and the network 12 is a portable telephone network.

The user accesses the URL (Uniform Resource Locator) of the power supply center 2, and as indicated by step S1, an application transmitted from the power supply center 2 is downloaded by the communication unit 11a (step S11). The application is downloaded for each individual electronic apparatus to be controlled. In this case, if it is desired to use the portable telephone as an ordinary remote control commander, an application including control items not related to power limitation is downloaded. It should be noted, however, that an application limited to items concerning power limitation may be downloaded.

Next, in step S12, the user opens a menu to make various settings. An example of the items to be set is given below.

Selection of the model of the electronic apparatus to be controlled (kind and manufacturer of the apparatus)

Selection of the kind of communication (infrared, Bluetooth)

Active/inactive Setting of the Power-limiting Function

Setting of a low power consumption mode according to the apparatus to be controlled (e.g. the setting of temperature when the electronic apparatus to be controlled is an air conditioner, or a setting to lower the luminance in the case of a television receiver)

On/Off control of the power source may be used as the low power consumption mode. However, this is not a very favorable scheme in the sense that if the power source is turned off, the apparatus cannot be used at all.

After settings are complete in the communication device 10, the power supply center 2 transmits a power-limiting signal (step S2), and the communication unit 11a of the communication device 10 receives the power-limiting signal (step S13). The power supply center 2 can transmit the same power-limiting signal to not only a specific one communication device but also to a number of communication devices within a selected area. At the time of making settings, it is determined in step S14 whether or not the power-limiting function is set active. If the power-limiting function is set inactive, the processing ends (step S15).

If it is determined in step S14 that the power-limiting function is set active, the application is started in step S16. In step S17, it is determined whether or not the kind of the communication that has been set is infrared. If the kind of the communication is infrared, in step S18, a power-limiting signal is transmitted to a target electronic apparatus via infrared communication by the communication unit 11b. If the kind of the communication is not infrared, in step S19, Bluetooth communication is performed by the communication unit 11b.

Unless the communication device 10 exists within the user's own home, even when a power-limiting signal is transmitted, the power-limiting signal is not delivered to the electronic apparatus of the other party. Thus, a power-limiting operation is not executed in actuality. Whether or not a power-limiting operation has been actually executed can be confirmed by two-way communication between the communication unit 11b and the electronic apparatus. A history indicating that the communication unit 11b has transmitted a remote control signal for entering the low power consumption mode is stored in a non-volatile memory included in the communication device 10. On the basis of an acknowledgment signal from the electronic apparatus, a history indicating that the lower power consumption mode has been actually entered is recorded.

History information stored in the communication device 10 is transmitted from the communication unit 11a of the communication device 10 to the power supply center 2 periodically or upon request from the power supply center 2 (step S20). The power supply center 2 receives the history information (step S3). Then, the history information is analyzed (step S4). For example, history information is managed for each individual user, and information on the kind of power limitation that has been executed can be obtained for each individual user. Such analysis results can be reflected on the power rates charged to users, for example.

[Power-limiting Operation]

An example of power-limiting operation according to the first example is described with reference to FIG. 3. In FIG. 3A, symbol 31a denotes time variation of total power consumption in a day. The total power consumption is estimated by the power supply side. The total power consumption is statistically calculated by taking variable factors such as season and the number of consumers into consideration, without use of any particular feedback information related to the actual power consumption from consumers such as homes. The value of the maximum power consumption is set as indicated by a broken line TG1, for example. When a time period during which power consumption exceeds the set value is reached, a power control signal that limits power consumption is transmitted from the power supply center 2 to the communication device 10 in each home. The remote control signal from the communication device 10 causes the power consumption of an electronic apparatus within the home to enter the low power consumption mode, thereby limiting the total power consumption as indicated by symbol 31b.

In FIG. 3B, symbol 32a denotes another example of time variation of total power consumption. As illustrated in FIG. 3B, the set value TG2 of maximum power consumption is set by taking typical changes in power consumption over time into consideration. In this case, when a time period during which power consumption exceeds the set value TG2 of maximum power consumption is reached, a power control signal that limits power consumption is transmitted from the power supply center 2 to the communication device 10 in each home. The remote control signal from the communication device 10 causes the power consumption of an electronic apparatus within the home to enter the low power consumption mode, thereby limiting the total power consumption as indicated by symbol 32b. Further, the set value of maximum power consumption may be made to vary in the same manner as the time variation of maximum power consumption. Further, the set value of maximum power consumption may be adapted to each individual user or each individual user group on the basis of user information (address, age, occupation, etc.).

<Second Example>

Lately, HEVs (Hybrid Electric Vehicles), EVs (Electric Vehicles), and PHEVs (Plug-in Hybrid Electric Vehicles) are being developed, and measures to address increases in load with increase in the number of these automobiles using electrical energy are becoming necessary. The second example can be applied to these measures.

Figure 4:
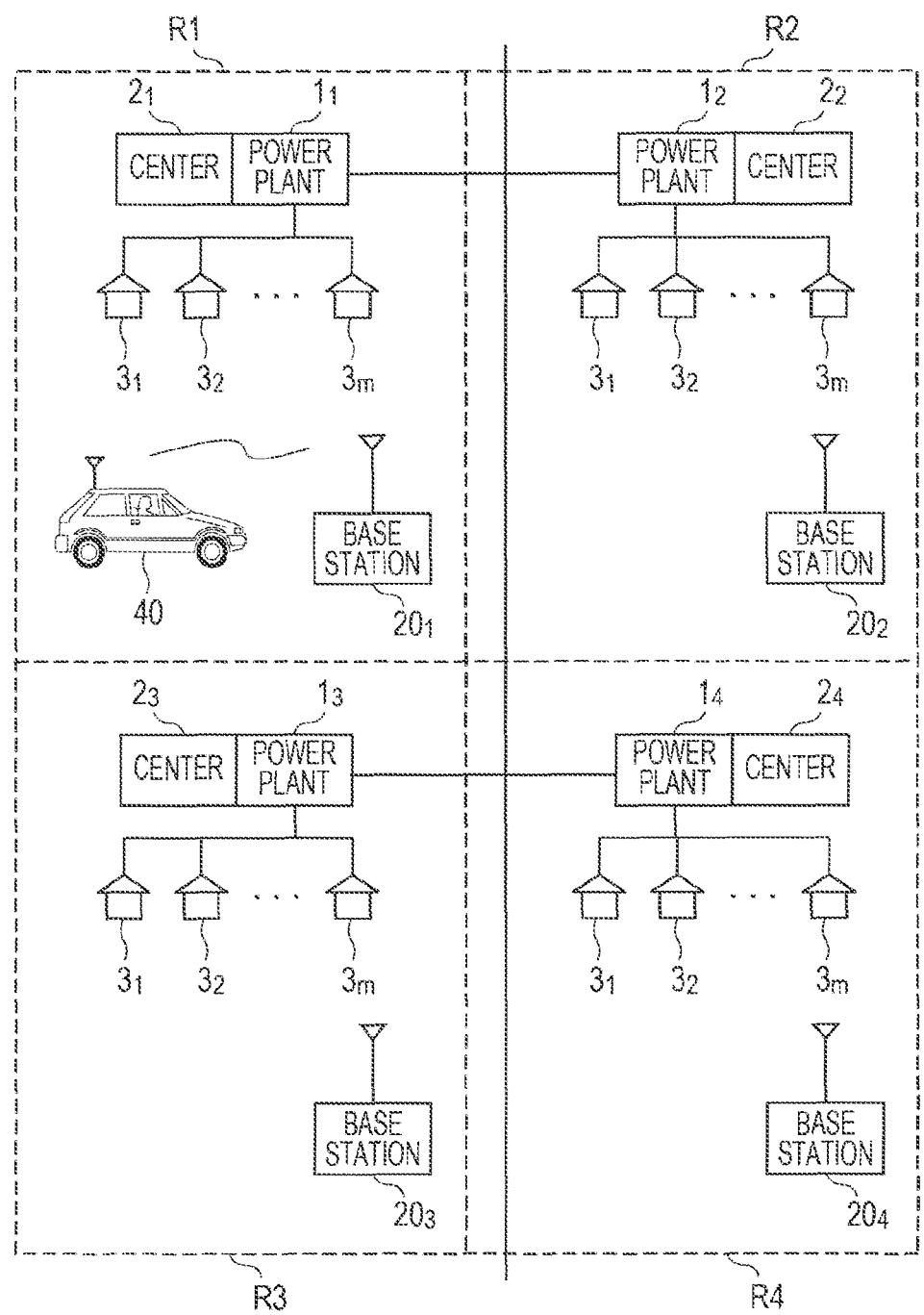
FIG. 4 is a block diagram of a second example of a power control system.

As illustrated in FIG. 4, for example, power plants 11, 12, . . . , and power supply centers 21, 22, . . . are installed for the respective areas (each indicated by a rectangle for simplicity) R1, R2, . . . covered by base stations 201, 202, . . . for portable telephones. The areas R1, R2, . . . are separated from each other by a center-to-center distance of about several km to several tens of km. Consumers 31, 32, . . . such as homes and office buildings are connected to the power plants 11, 12, . . . , respectively. The power plants 11, 12, . . . (or the power supply centers 21, 22, . . . ) are able to communication with each other.

An automobile 40 using a PHEV scheme is able to communicate with the base stations 201, 202, . . . , for example. The base stations 201, 202, . . . are, for example, base stations for portable telephones. As the capacity of the secondary battery of the automobile 40 decreases and charging becomes necessary, an inquiry about charging locations is made to the power supply center 21 in the area R1 to which the automobile 40 belongs. The current position of the automobile 40 is located from the inquiry. The positional information need not be detailed but may be any information as long as the area where the automobile is driving is located.

The power supply center 21 having received the inquiry about charging locations performs communication with the area R1 of the current position of the automobile 40, and the power supply centers 22, 23, 24, . . . in the surrounding adjacent areas R2, R3, R4, . . . , and acquires information about total power consumptions in the respective areas. Then, information on charging facilities (including homes) in the area with the least total power consumption is transmitted to the automobile. Alternatively, information on charging facilities in the area where a power plant with the greatest surplus supply power exists is transmitted to the automobile. The automobile 40 goes to the charging facilities in accordance with the transmitted information, and performs charging. In this case, the distance between the current position of the automobile 40 and the charging location may be taken into consideration.

<3. Modifications>

While the invention has been described in detail above, the invention is not limited to the above-mentioned example, but various modifications based on the technical idea of the invention are possible. For example, the first communication unit 11a of the communication device 10 may communicate with the power supply center via the Internet. Further, the first communication unit 11a of the communication device 10 may include a receiver for FM (Frequency Modulation), AM (Amplitude Modulation), or both. In cases where there is no need to exchange information in two ways, and it suffices to only receive information, the remote commander may be controlled in a simple manner by carrying control information on an FM or AM radio wave.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 power plant
2 power supply center
3 home
91 to 9n electronic apparatus
10 communication device
11a first communication unit
11b second communication unit
12 network

The invention claimed is:

1. A communication method comprising:
providing communication between a first power supply center and a base station;
providing communication between the base station and an electric vehicle including a battery and a communication section;
performing an inquiry by the electric vehicle to the first power supply center via the base station for a charging facility information when capacity of the battery of the electric vehicle decreases below a predetermined value; and
transmitting the charging facility information to the electric vehicle, wherein the charging facility information includes a charging facility configured to supply power to the electric vehicle,
wherein the first power supply center is configured to communicate with a plurality of power supply centers in proximity to the electric vehicle; acquire a total power consumption for each of the power supply centers; and only transmit the charging facility information associated with one of the power supply centers having a least amount of total power consumption among the power supply centers to the electric vehicle; and
wherein the power supply center having the least amount of total power consumption is configured to supply power to at least an electronic apparatus in a low power consumption mode having one or more of a lowered illuminance, a lowered image processing function, a lowered operating clock frequency, a lowered brightness and a higher temperature setting of the electronic apparatus.

2. The communication method according to claim 1, wherein the electric vehicle is configured to receive the charging facility information from the base station.

3. The communication method according to claim 1, wherein the inquiry for the charging facility information input by a user via an input device of the electric vehicle.

4. The communication method according to claim 1, wherein a current position of the electric vehicle is configured to be located through the inquiry.

5. The communication method according to claim 1, wherein the charging facility information is associated with one of the power supply centers having a maximum surplus power supply.

6. A power supply method comprising:
providing communication between a first power supply center and a base station;
providing communication between the base station and an electric vehicle including a battery via a wireless network;
performing an inquiry by the electric vehicle to the first power supply center via the base station for a charging facility information when capacity of the battery of the electric vehicle decreases below a predetermined value; and
transmitting power supply information to the electric vehicle, wherein the power supply information includes the charging facility information and the charging facility information includes a charging facility configured to supply power to the electric vehicle,
wherein the first power supply center is configured to communicate with a plurality of power supply centers in proximity to the electric vehicle; acquire a total power consumption for each of the power supply centers; and only transmit the charging facility information associated with one of the power supply centers having a least amount of total power consumption among the power supply centers to the electric vehicle; and wherein the power supply center having the least amount of total power consumption is configured to supply power to at least an electronic apparatus in a low power consumption mode having one or more of a lowered illuminance, a lowered image processing function, a lowered operating clock frequency, a lowered brightness and a higher temperature setting of the electronic apparatus.

7. The power supply method according to claim 6, wherein the electric vehicle is configured to receive the power supply information from the base station.

8. The power supply method according to claim 6, wherein a current position of the electric vehicle is configured to be located through the inquiry.

9. The power supply method according to claim 6, wherein the power supply information is associated with one of the power supply centers having a maximum surplus power supply.

10. An electric vehicle comprising:
a battery; and
a communication section that communicates with a base station via a wireless network;
wherein the communication section transmits an inquiry to the first power supply center via the wireless network for a charging facility information when capacity of the battery of the electric vehicle decreases below a predetermined value;
wherein the electric vehicle is configured to receive power supply information including charging facility information from the first power supply center,
wherein the first power supply center is configured to communicate with a plurality of power supply centers in proximity to the electric vehicle; acquire a total power consumption for each of the power supply centers; and only transmit the charging facility information associated with one of the power supply centers having a least amount of total power consumption among the power supply centers to the electric vehicle; and
wherein the power supply center having the least amount of total power consumption is configured to supply power to at least an electronic apparatus in a low power consumption mode having one or more of a lowered illuminance, a lowered image processing function, a lowered operating clock frequency, a lowered brightness and a higher temperature setting of the electronic apparatus.

11. The electric vehicle according to claim 10, wherein the inquiry for the charging facility information is input by a user via an input device of the electric vehicle.

12. The electric vehicle according to claim 10, wherein a current position of the electric vehicle is configured to be located through the inquiry.

13. The electric vehicle according to claim 10, wherein the power supply information is associated with one of the power supply centers having a maximum surplus power supply.

14. A power control system comprising:
a plurality of power supply centers including a first power supply center;
a base station; and
an electric vehicle including a battery and a communication section that communicates with a base station via a wireless network;
wherein the communication section transmits an inquiry to the first power supply center via the wireless network for a charging facility information when capacity of the battery of the electric vehicle decreases below a predetermined value;
wherein the electric vehicle is configured to receive power supply information including charging facility information from the first power supply center,
wherein the first power supply center is configured to communicate with the plurality of power supply centers in proximity to the electric vehicle; acquire a total power consumption for each of the power supply centers; and only transmit the charging facility information associated with one of the power supply centers having a least amount of total power consumption among the power supply centers to the electric vehicle; and
wherein the power supply center having the least amount of total power consumption is configured to supply power to at least an electronic apparatus in a low power consumption mode having one or more of a lowered illuminance, a lowered image processing function, a lowered operating clock frequency, a lowered brightness and a higher temperature setting of the electronic apparatus.

* * * * *